United States Patent Office 2,979,849
Patented Apr. 18, 1961

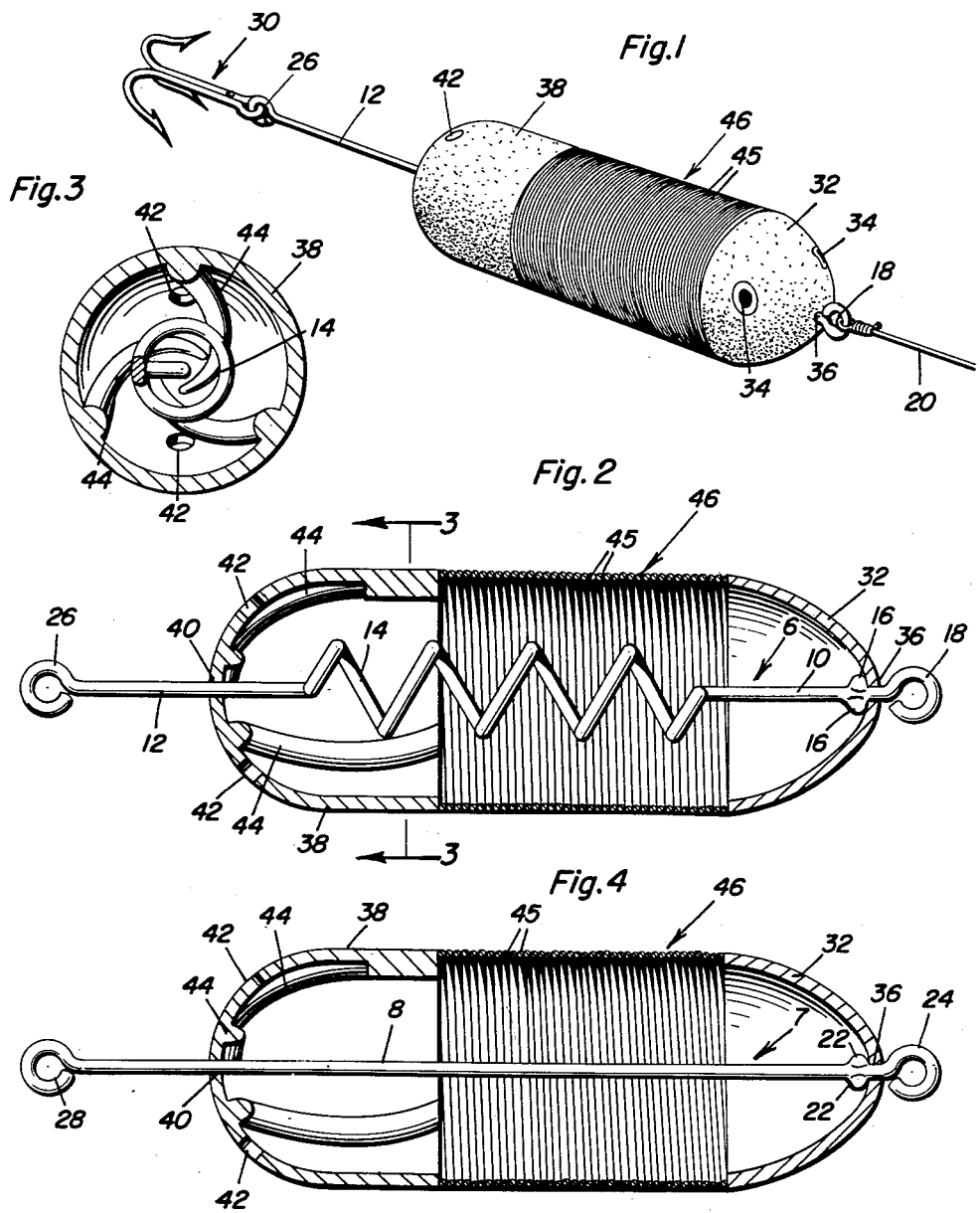

2,979,849
ANIMATED ARTIFICIAL BAIT
Hiram D. Anderson, Jr., Box 255, Stevens Point, Wis.
Filed Mar. 21, 1958, Ser. No. 722,925
2 Claims. (Cl. 43—42.02)

The present invention relates to an artificial fishing bait characterized by a head section, a tail section, and a body portion or section which is interposed between and serves to operatively connect the head and tail sections with each other.

As is evident from the preceding general statement of the invention sectional lures are not new. In fact the underlying principle of relative movement between interconnected parts and components resulting in animation is present in analogous prior art adaptations and in prior patents in which unpredictable relative movement of parts resulting from motion of the lure or bait travelling through water is well known. An object of the instant invention is to construct and provide an innovation in this line of endeavor and which is novel in that the head and tail sections or components are of hollow cup-like form with their open portions facing each other and are connected together by way of an intervening resiliently elastic body portion.

More specifically, the invention has to do with a helical spring the coils of which are highly resilient and sensitive and are normally in contacting alignment, that is when no external force is acting and which respond to a rhythmical working of the fishing rod tip action transmitted through the fishing line so as to cause the bait to alternately elongate and contract as do worms and many other creatures of the water in their natural process of locomotion.

The invention will also respond by vibrating and becoming lively and animated due to the motion and behavior of the spring and the change in shape and appearance as it contracts and expands. Action of water currents, waves, and other external forces, in addition to the action of the fishing rod by the fisherman, also will cause the over-all bait to become lively and animated.

Briefly, the head section, which is suitably decorated for sake of appearance, is connected with a foremost coil. The tail section is similarly joined to the rearmost coil. There is a flexibly resilient elongated element extending through the bore defined by the coils of the spring and which also extends through and beyond the holes provided therefor in the head and tail sections. The extending end portions of the flexible element have eyes, one for attachment of a line thereto and the other to which a fishhook is connected.

The invention may be weighted and caused to work along the bottom, in which case the varied resistance of the lake or stream bed would cause the invention to expand, contract and to become distorted and animated, or it may be made of light material so as to partially float on the surface.

A concept has to do, in part, with an effort by this applicant to take advantage of the movement and control of a fishing line, and motion of an artificial bait when in water and to so construct the bait that the cooperating components will each contribute to the production of a creature in imitation of a worm (or the like) and, relying on contraction and expansion properties and behavior simulating muscular activities in a worm and to attract and thus more successfully land a fish.

Other objects, features and advantages will become more readily apparent from the following description and the accompanying drawing.

In the drawing:

Fig. 1 is a perspective view of a bait constructed in accordance with the principles of the present invention.

Fig. 2 is a view in section and elevation which may be said to be a longitudinal section through the bait proper seen in Fig. 1.

Fig. 3 is a cross section on the line 3—3 of Fig. 2.

Fig. 4 is a view like Fig. 2 showing a slight modification in construction.

In both Figs. 2 and 4 the part which is referred to as a connecting and assembling element is denoted by the numeral 6 (Fig. 2) and 7 (Fig. 4). Basically, these elements 6 and 7 are much the same in that each is an elongated flexibly resilient element. The element 7 in Fig. 4 is normally or approximately straight as denoted in Fig. 4 at 8. In Fig. 2 the correspondingly functioning element has straight end portions 10 and 12 connected at their inner ends by springy coils 14. The numeral 16 designates one of the two lugs which constitute shoulders. Just beyond these shoulders there is an eye 18 to accommodate the fishing line 20 as seen in Fig. 1. Similarly performing lugs 22 are seen in Fig. 4 beyond which there is the line attaching eye 24. At the left or rear end portions of the elements 6 and 7 in Figs. 2 and 4 there is another eye 26 (Fig. 2) and 28 (Fig. 4) to accommodate the fish hook 30 in the manner seen in Fig. 1. Thus the elements 6 and 7 are basically the same but the median coiled portion of the element 6 allows it to flex more freely from side to side up and down and more or less an indeterminate manner. These elements constitute assembling and tying members and assist in joining the components which go to make up the three-part or sectional bait body. As already implied in all of the figures, the blunt-nosed hollow head section is denoted at 32 and is suitably dressed or finished to provide eyes 34 and there is a hole at the center at 36. The shouldered eye-equipped end cooperates with this portion of the head as best seen in Figs. 2 and 4. The hollow tail section is denoted by the numeral 38 and this forms a fluid or water trapping cup and has a central hole 40 and exhaust ports 42. On the interior of each "cup" spiralling ribs 44 are provided and these cooperate in imparting motion to the cup. Interposed between and connecting the head and tail components or sections is the body portion section 46 which, as already mentioned is a resiliently flexible coil spring. It is perhaps more accurate to describe it as a helical spring. Moreover, and although the coils or convolutions appear somewhat stout in the drawing this is because the showing in the drawing is greatly exaggerated. In actual manufacture and production the coils will be made of fine sensitive springy wire. The principle of operation is that the coils are easily responsive to motion imparted thereto by handling the line or fishing rod or the movement of the device as an entity through the water.

The responsive spring principle (Fig. 2) gives the bait life-like action simulating muscular contraction and expansion like that of locomotive forces of creatures that crawl and swim in the water.

This bait would also give the fisherman some "rod-tip" action and increase efficiency of the bait-like-rod and reel action. It would prevent many a leader from being snapped where the like was normally drawn taut or the fisherman's rod-tip should be down when the strike occurred.

By the series of veins or ribs inside the cup section (the tail section) or by perforating in various portions of the tail section or by shaping the contour of the inside hollow portion, the bait has a side to side wiggle, and an up and down wiggle or a combination of two as well as a contraction and expansion wiggle.

The coils of the spring have the inherent vital properties necessary to render them self-restoring and also capable of animated motion simulating uninhibited behaviour. The fact is that the coil springs can be made so sensitive that the body portion can be caused to tremble and quiver, to flex, and to distort giving the appearance of disturbed agitation, also an appearance of contortion and, at times, a struggle tending to entice attack by a victim fish.

With reference again to the element 7 it should perhaps be pointed out that this in practice may be a suitable length of steel piano wire of requisite gauge so that it is sufficiently stiff and stays approximately straight permitting the tail section to ride back and forth on it. Therefore, the element 7 is distinguishable from the element 6 the property of which is not only that which allows flexing in all directions but expansion and contraction too.

Minor changes in shape, size, materials and rearrangement of parts may be resorted to in actual practice without departing from the spirit of the invention or the scope of the invention as claimed.

What is claimed as new is as follows:

1. An artificial bait comprising an elongated flexibly resilient member having an eye at one end inwardly of which lugs are provided constituting stop shoulders, a rearwardly opening and facing cup-like member mounted on said resilient member between the eye and shoulders and constructed to provide an imitation head, a forwardly opening centrally apertured cup-like tail section, the central aperture therein providing a bearing, and an adjacent portion of said resilient member extending rearwardly through and outwardly beyond said bearing and having a hook attaching eye, said tail section being provided with water discharge holes, and a highly sensitive helical coil spring interposed between the adjacent ends of the head and tail sections and having cooperating coils attached respectively to said sections.

2. An artificial bait comprising a rigid hollow head portion, a rigid hollow tail portion, separate and longitudinally spaced from the head portion, and a body portion interposed between, connected at its end to, and operatively joining said head and tail portions in complemental and operative relationship, said body portion comprising a relatively long coil spring which is flexibly resilient, extensible and contractible and vibratory in character, is readily responsive and distorted when vibrated or subjected to stress or external forces, said coil spring serving yieldably to couple said head and tail portions in such a way that they may assume ever-changing and unpredictable positions relative to each other and said body portion, and an elongated flexibly resilient connecting element disposed lengthwise and axially of the head, tail and body portions and mechanically and operatively linking the same together, a median portion of said connecting element being confined within the limits of said head, tail and body portions and coiled and extensible and contractible, whereby to promote rhythmical elongation and contraction resulting from the accordion-like functioning of the coils of the coiled median portion.

References Cited in the file of this patent

UNITED STATES PATENTS

| | | |
|---|---|---|
| 1,144,756 | Damsa | June 29, 1915 |
| 1,451,436 | Barnia | Apr. 10, 1923 |
| 2,098,095 | Hoefler | Nov. 2, 1937 |
| 2,106,755 | McArthur | Feb. 1, 1938 |
| 2,112,385 | Smith | Mar. 29, 1938 |
| 2,583,900 | Spence | Jan. 29, 1952 |
| 2,606,390 | Farmer | Aug. 12, 1952 |
| 2,862,330 | Malsed | Dec. 2, 1958 |

FOREIGN PATENTS

| | | |
|---|---|---|
| 3,631 | Great Britain | Feb. 21, 1905 |